(12) United States Patent
Burdass et al.

(10) Patent No.: US 7,882,293 B2
(45) Date of Patent: Feb. 1, 2011

(54) INTERRUPT MASKING CONTROL

(75) Inventors: Andrew Burdass, Ely (GB); David James Seal, Cambridge (GB)

(73) Assignee: ARM Limited, Cambridge (GB)

( * ) Notice: Subject to any disclaimer, the term of this patent is extended or adjusted under 35 U.S.C. 154(b) by 1971 days.

(21) Appl. No.: 10/886,576

(22) Filed: Jul. 9, 2004

(65) Prior Publication Data

US 2005/0138257 A1 Jun. 23, 2005

(30) Foreign Application Priority Data

Dec. 23, 2003 (GB) ................. 0329863.5

(51) Int. Cl.
*G06F 13/24* (2006.01)
*G06F 3/00* (2006.01)
*G06F 13/14* (2006.01)

(52) U.S. Cl. ........................ 710/262; 710/5; 710/244

(58) Field of Classification Search ................. 710/262, 710/5; 712/244
See application file for complete search history.

(56) References Cited

U.S. PATENT DOCUMENTS

| | | | |
|---|---|---|---|
| 4,004,283 A | | 1/1977 | Bennett et al. |
| 4,349,872 A * | | 9/1982 | Fukasawa et al. ............. 710/262 |
| 5,448,743 A * | | 9/1995 | Gulick et al. ................. 710/49 |
| 5,530,597 A * | | 6/1996 | Bowles et al. ................ 710/262 |
| 5,781,187 A * | | 7/1998 | Gephardt et al. ............. 710/309 |
| 5,875,342 A * | | 2/1999 | Temple ........................ 710/260 |
| 5,905,897 A * | | 5/1999 | Chou et al. ................... 710/260 |
| 5,937,199 A * | | 8/1999 | Temple ........................ 710/262 |
| 6,327,508 B1 * | | 12/2001 | Mergard ........................ 700/5 |
| 6,356,998 B2 * | | 3/2002 | Roche ......................... 712/244 |
| 6,633,940 B1 * | | 10/2003 | Alasti et al. ................. 710/262 |
| 6,678,766 B1 * | | 1/2004 | Feustel ........................ 710/100 |
| 6,757,818 B1 * | | 6/2004 | Nishitani ..................... 712/245 |
| 6,845,419 B1 * | | 1/2005 | Moyer ......................... 710/264 |
| 6,985,986 B2 * | | 1/2006 | Boles et al. ................... 710/262 |
| 7,007,172 B2 * | | 2/2006 | Catherwood .................. 726/23 |
| 7,130,949 B2 * | | 10/2006 | Belmar et al. ................ 710/260 |
| 7,155,598 B2 * | | 12/2006 | Henry et al. ................. 712/226 |
| 7,546,446 B2 * | | 6/2009 | Henry et al. ................. 712/244 |
| 2003/0167366 A1 * | | 9/2003 | Radhakrishna .............. 710/262 |

FOREIGN PATENT DOCUMENTS

| | | |
|---|---|---|
| EP | 0206654 | 6/1986 |
| JP | 62190533 | 8/1987 |
| JP | 1184545 | 7/1989 |

* cited by examiner

*Primary Examiner*—Paul R Myers
*Assistant Examiner*—Christopher A Daley
(74) *Attorney, Agent, or Firm*—Nixon & Vanderhye P.C.

(57) ABSTRACT

A processor core 4 is provided with an interrupt controller 22 which serves to set an interrupt mask bit F and a hardware control when an interrupt fiq occurs. A masking control signal NMI serves to either allow or prevent the software clearing of the interrupt mask bit F.

18 Claims, 2 Drawing Sheets

INTERRUPT MASKING CONTROL

TECHNICAL FIELD

This technical field is data processing systems, and the technology relates to the control of the masking of interrupt signals within data processing systems.

BACKGROUND

It is known to provide data processing systems, such as the ARM processors designed by ARM Limited, Cambridge, England, which are responsive to received interrupt signals to interrupt a normal sequence of program instructions and redirect processing to an interrupt handler sequence of processing instructions. This type of behaviour is important in providing the ability for a data processing system to rapidly respond to external events. As an example, a data processing system may be used to control an anti-lock braking system with the occurrence of a skid condition being signalled to the processor via an interrupt signal which is able to quickly interrupt whatever processing is currently underway and commence execution of appropriate instructions to deal with the critical skid condition.

In order that a data processing system can avoid incorrect operation due to repeated or continuous assertion of an interrupt signal which would otherwise cause the interrupt handling code itself to be interrupted, it is known to provide systems with an interrupt masking bit which is set by hardware upon first occurrence of an interrupt and serves to block the effect of subsequent interrupt signals received on that interrupt signal line until the masking bit has been cleared, typically under software control once a certain portion of the interrupt handling code has been executed. With ARM processors, an example of this type of behaviour is provided by the F bit within the program status register. The ability to alter the F bit under program control is useful in that it provides considerable flexibility in the way that interrupts and interrupt masking may be used, e.g. it is possible to use the F bit under software control to enforce the atomic execution of a sequence program instructions by precluding the possibility of an interrupt being acted upon during that sequence of instructions (the F bit may be set to mask interrupts at the start of the sequence of instructions and reset at the end of the sequence of instructions thereby ensuring atomic execution).

A problem with this arrangement is that the ability for the interrupt masking bit to be set under software control creates the possibility that a programming bug or other software based malfunction may lead to the interrupt masking bit being inappropriately set and so preventing the ability of the system to promptly react to what may be a time critical interrupt signal.

SUMMARY

Viewed from one aspect the present invention provides an apparatus for processing data, said apparatus comprising:

processing logic operable to execute data processing operations specified by a normal sequence of program instructions;

an interrupt circuit responsive to an interrupt signal to interrupt execution of said normal sequence of program instructions and redirect execution to an interrupt handling sequence of program instructions; and a programmable control register operable to store an interrupt mask bit, said interrupt circuit being responsive to:

(i) a first state of said interrupt mask bit to prevent said interrupt circuit from responding to said interrupt signal; and (ii) a second state of said interrupt mask bit to allow said interrupt circuit to respond to said interrupt signal; wherein said interrupt circuit sets said interrupt mask bit to said first state when responding to said interrupt signal; and further comprising:

a masking control circuit responsive to a masking control signal to selectively disable changing under program instruction control of said interrupt mask bit from said second state to said first state.

The inventors recognised the above problem and provided the solution of using an additional masking control signal, not accessible to software, to disable the ability to change the interrupt mask bit from the state in which it does not block its associated interrupt into the state in which it does block its associated interrupt. Thus, when the masking control signal is asserted it is not possible for software to inappropriately mask out further interrupt signals so comprising the ability of the system to respond to those interrupt signals.

Whilst it will be appreciated that it would be possible for the interrupt masking bit to be cleared under hardware control, in preferred embodiments this will normally be cleared by a write instruction to the programmable control register.

Whilst it is possible that a simple system may have a single interrupt signal, preferred embodiments of the invention utilise multiple interrupt signals, each having an associated interrupt mask bit.

In the context of such a system having multiple interrupt signals, these are advantageously prioritised such that a high priority signal overrides a lower priority signal. In the context of such a system the functionality of being able to guarantee interrupt service for critical interrupts may be provided by using the masking control signal in combination with only the higher priority interrupt.

In preferred embodiments there is provided a program status register which stores a plurality of bits indicative of the current processing state of the system. In the context of such a system it is convenient to provide one or more saved program status registers into which processing status information may be saved upon a mode switch. This information will typically include any interrupt mask bits. Accordingly, preferred embodiments are operable such that when program status information is restored this does not result in a change of the interrupt mask bit from the second state to the first state when the masking control signal indicates this is not permitted.

It is known to provide systems which operate in either a secure or non-secure mode. In the context of such systems it is advantageous to provide an override interrupt reserving signal which serves to disable all changes to the interrupt mask bit when operating in the non-secure mode. As an example, this can assist in preventing a security breach based upon an attack seeking to block interrupt signals which are performing necessary security related checking functions.

Whilst it will be appreciated that the masking control bit may be provided in a variety of different ways, preferred embodiments use a static external signal value, whose state may also be read but not modified using a bit within a coprocessor configuration register, to give the masking control signal.

Viewed from another aspect the present invention provides a method of processing data, said method comprising the steps of:

executing data processing operations specified by a normal sequence of program instructions;

in response to an interrupt signal interrupting execution of said normal sequence of program instructions and redirecting execution to an interrupt handling sequence of program instructions; and storing an interrupt mask bit operable such that:
(i) a first state of said interrupt mask bit prevents a response to said interrupt signal; and
(ii) a second state of said interrupt mask allows a response to said interrupt signal; wherein
said interrupt mask bit is set to said first state when responding to said interrupt signal; and:

in response to a masking control signal selectively disabling changing under program instruction control of said interrupt mask bit from said second state to said first state.

DESCRIPTION

Figure 1:
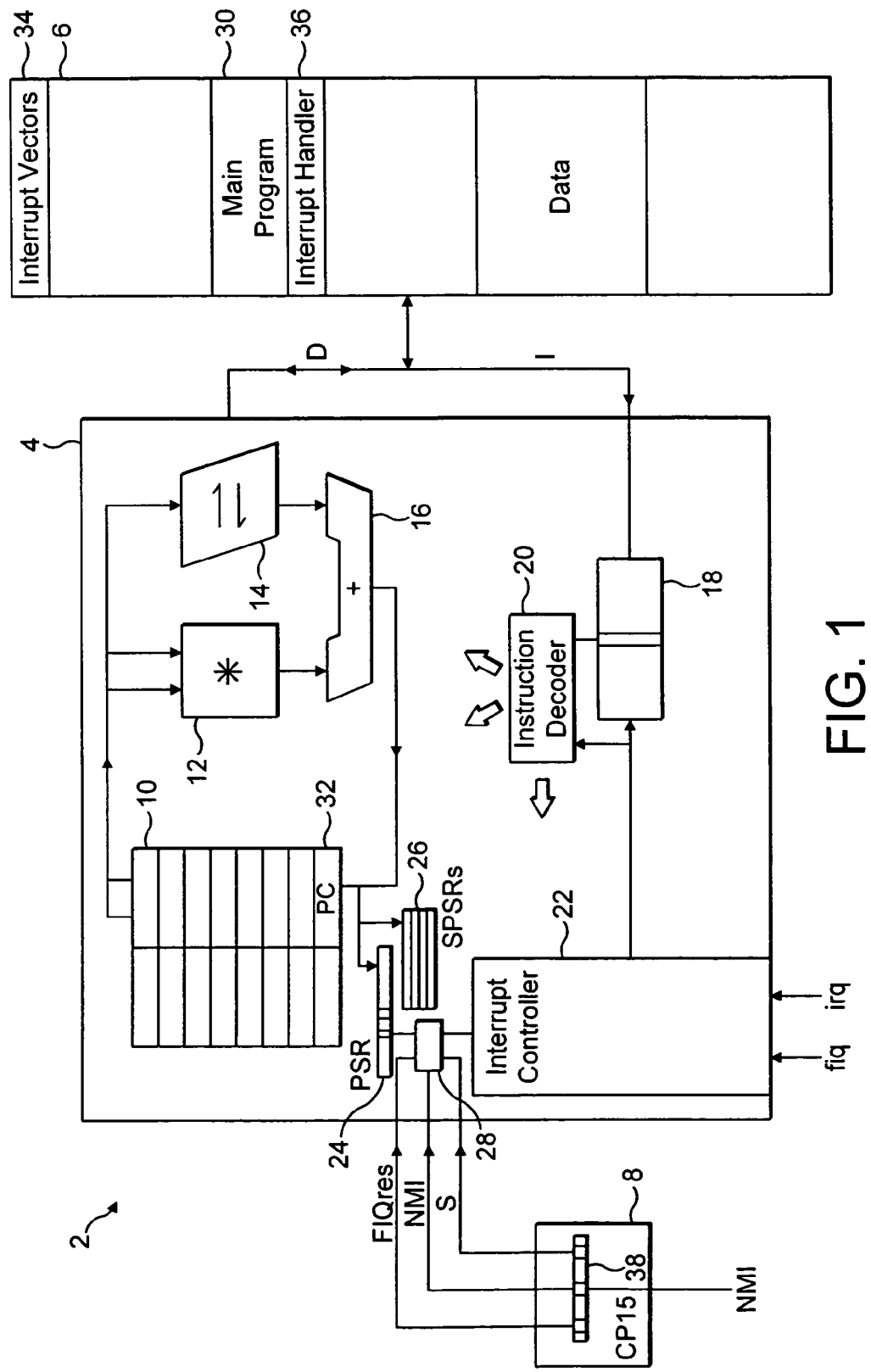
FIG. 1 schematically illustrates a data processing system provided with a plurality of interrupt signals and utilising interrupt masking and interrupt masking control.

FIG. 1 illustrates a data processing system 2 including a processor core 4, a memory 6 and a coprocessor 8. The processor core 4 includes a register bank 10, a multiplier 12, a shifter 14, an adder 16, an instruction pipeline 18, an instruction decoder 20, an interrupt controller 22, a program status register 24, a plurality of saved program status registers 26 and an interrupt mask controlling circuit 28. In normal operation a sequence of program instructions from a main program 30 stored within the memory 6 is supplied to the instruction pipeline is 18 and decoded by the instruction decoder 20 to generate control signals which configure and control the remainder of the circuit elements within the processor core 4 to execute the desired processing operations. It will be appreciated that the processor core 4 will typically include many additional circuit elements, but these have not been illustrated in FIG. 1 for the sake of clarity.

The interrupt controller 22 is responsive to two external signals, namely a fast interrupt signal fiq and a slow interrupt signal irq. The fast interrupt signal fiq has priority over the slow interrupt signal irq and thus a fast interrupt signal fiq is able to override an existing slow interrupt. In this example, when an interrupt signal is received, the interrupt controller 22 interrupts the execution of the normal sequence of program instructions from the main program 30 and forces a redirection of processing by loading a memory location into the program counter register 32 corresponding to a predetermined position within a set of interrupt vectors 34 stored within the memory 6. Execution of a jump instruction at that interrupt vector location then directs processing to an interrupt handler 36 stored elsewhere within the memory 6 with that interrupt handler serving to execute the desired interrupt handling sequence of program instructions. When the interrupt signal is received by the interrupt controller 22, it sets an associated interrupt masking bit within the program status register 24. The action of this interrupt masking bit is to inhibit a subsequent response to a further interrupt signal received until that interrupt masking bit is cleared. Both the fast interrupt fiq and the slow interrupt irq have an associated interrupt masking bit.

As illustrated, there are provided a plurality of saved program status registers 26. These serve to save a set of bits corresponding to the contents of the program status register 24 upon a processor mode switch. Thus, for example, when the processor core 4 switches for whatever reason from a user mode to a privileged mode, the user mode program status register contents are saved into an appropriate one of the saved program status registers 26 from where they can be restored when a return is made to the user mode from the mode to which the jump has been made. Included within the program status registers are the interrupt masking bits for both the fast interrupt fiq and the slow interrupt irq.

As illustrated in FIG. 1, a masking control circuit 28 is provided which serves to control changes which may be made to the interrupt masking bit associated with the fast interrupt fiq. The masking control circuit is itself responsive to a secure mode signal S indicating whether the processor core 4 is currently operating in either a secure or non-secure mode, a fast interrupt reserved signal FIQres indicating whether fast interrupts are to be reserved to only the secure mode of operation and a non-maskable interrupt signal NMI indicating that the fast interrupts are to be non-maskable under program control. As illustrated, the configuration coprocessor 8 includes a configuration register 38 which includes bits reflecting the state of the S, FIQres and NMI control signals. These are illustrated as being provided within a single coprocessor configuration register 38, but it will be appreciated that they could be separately provided or provided by directly applied external signals. In the case of the NMI signal, this is desirably provided by an external signal value.

One action of the masking control circuit 28 is to block the setting of the interrupt mask bit associated with the fast interrupt fiq under program instruction control when the masking control signal NMI is asserted. Thus, with the NMI signal asserted the interrupt controller 22 can set the interrupt mask bit F associated with the fast interrupt fiq when a fast interrupt fiq occurs but this bit may not be set under software control. Software is still able to reset the interrupt mask bit F in order to reenable interrupts after they have been disabled by the hardware interrupt controller.

Figures 2, 3:
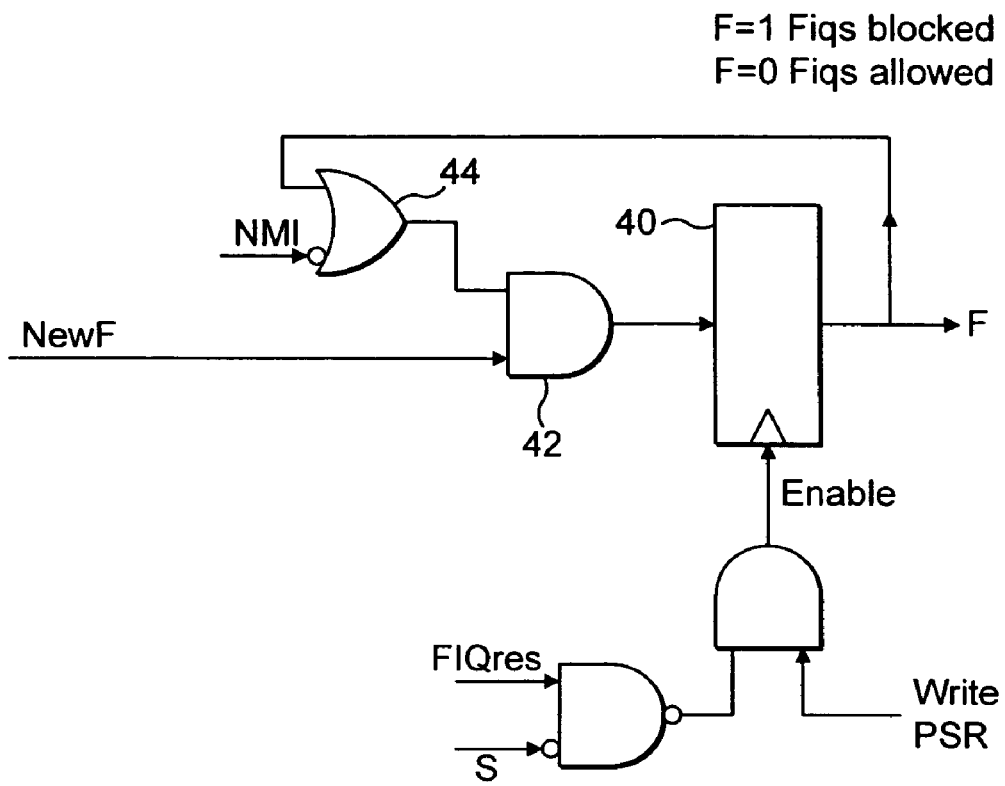
FIG. 2 is a circuit diagram schematically illustrating a circuit which may be used to provide interrupt masking control.
FIG. 3 illustrates two truth tables corresponding to the operation of the circuit of FIG. 2.

FIG. 2 illustrates the masking control circuit in more detail. A flop 40 is provided which serves to store the interrupt mask bit F associated with the fast interrupt fiq. It will be appreciated that this flop 40 in practice will form one bit within the program status register 24. Writing to the flop 40 is enabled by a signal derived from a writePSR signal which is gated by a combination of a signal indicating whether or not the processor core 4 is currently operating in a secure mode or a non-secure mode together with a signal indicating whether or not fast interrupts fiq are reserved to the secure mode only. If the processor core 4 is operating in the non-secure mode as indicated by S value of "0" and fast interrupts are reserved to the secure mode as indicated by a FIQres value of "1", then the writePSR signal will permanently be blocked and no changes will be possible to the interrupt mask bit F stored within the flop 40. In other conditions, the writePSR signal will be passed and the currently stored interrupt mask bit F will be updated with a new value subject to the action of the AND gate 42 and the OR gate 44.

The combined action of the AND gate 42 and the OR gate 44 is illustrated by the truth tables of FIG. 3. In particular, when the NMI value is "1", then the new value of the interrupt mask bit F will only be allowed to pass through the AND gate 42 when the current interrupt mask bit F is a "1". Thus, the interrupt mask bit F may be cleared down to an "0" when NMI is "1", but may not be set and changed from "0" to a value of "1". The portion of 46 of the second truth table of FIG. 3 illustrates this behaviour, namely when the current value of the interrupt mask bit is "0" and the value of NMI "1", then a new value of the interrupt mask bit NewF of "1" will not force the bit stored within the flop 40 to become "1". Conversely, the first truth table in FIG. 3 shows the bits stored within the flop 40 following the NewF value irrespective of what the previous interrupt mask bit F value was whilst the NMI signal has a value of "0".

Although illustrative embodiments have been described in detail herein with reference to the accompanying drawings, it is to be understood that the claims are not limited to those precise embodiments, and that various changes and modifications can be effected therein by one skilled in the art without departing from the scope of the appended claims.

We claim:

1. Apparatus for processing data, said apparatus comprising:
   processing logic arranged to execute data processing operations specified by a normal sequence of program instructions;
   an interrupt circuit responsive to an interrupt signal to interrupt execution of said normal sequence of program instructions and redirect execution to an interrupt handling sequence of program instructions; and
   a programmable control register arranged to store an interrupt mask bit, said interrupt circuit being responsive to:
   (i) a first state of said interrupt mask bit to prevent said interrupt circuit from responding to said interrupt signal; and
   (ii) a second state of said interrupt mask bit to allow said interrupt circuit to respond to said interrupt signal; wherein
   said interrupt circuit sets said interrupt mask bit to said first state when responding to said interrupt signal; and further comprising:
   a masking control circuit responsive to a masking control signal to selectively disable changing under program instruction control of said interrupt mask bit from said second state to said first state.

2. Apparatus as claimed in claim 1, wherein said interrupt handling sequence of program instructions includes a write instruction to said programmable control register to change said interrupt mask bit from said first state to said second state.

3. Apparatus as claimed in claim 1, wherein said interrupt circuit is responsive to a plurality of interrupt signals, each of said plurality of interrupt signals having an associated interrupt mask bit.

4. Apparatus as claimed in claim 3, wherein said plurality of interrupt signals include a first interrupt signal and a second interrupt signal, said first interrupt signal having a higher priority than said second interrupt signal, said first interrupt signal having an associated masking control signal and said second interrupt signal not having an associated masking control signal.

5. Apparatus as claimed in claim 1, wherein said programmable control register is a program status register arranged to store a plurality of bits indicative of a current processing state of said apparatus.

6. Apparatus as claimed in claim 5, wherein said apparatus is arranged in a plurality of processing modes and comprising one or more saved program status registers into which said plurality of bits stored within said program status register are saved when switching to a different processing mode and from which said plurality of bits are restored when returning from said different processing mode subject to said masking control circuit preventing any change of said interrupt mask bit from said second state to said first state.

7. Apparatus as claimed in claim 1, wherein said apparatus is arranged in either a secure mode or a non-secure mode and when operating in said non-secure mode said masking control circuit is responsive to an override interrupt reserving signal to selectively disable all changes to said interrupt mask bit.

8. Apparatus as claimed in claim 1, comprising a configuration coprocessor including at least one configuration register arranged to store at least one configuration controlling parameter, said masking control signal being a read only configuration bit within said configuration register.

9. Apparatus as claimed in claim 1, wherein said masking control signal is provided as a static external signal value to said apparatus.

10. A method of processing data, said method comprising the steps of:
    executing data processing operations specified by a normal sequence of program instructions;
    in response to an interrupt signal interrupting execution of said normal sequence of program instructions and redirecting execution to an interrupt handling sequence of program instructions; and
    storing an interrupt mask bit such that:
    (i) a first state of said interrupt mask bit prevents a response to said interrupt signal; and
    (ii) a second state of said interrupt mask allows a response to said interrupt signal; wherein
    said interrupt mask bit is set to said first state when responding to said interrupt signal; and:
    in response to a masking control signal selectively disabling changing under program instruction control of said interrupt mask bit from said second state to said first state.

11. A method as claimed in claim 10, wherein said interrupt handling sequence of program instructions includes a write instruction to said programmable control register to change said interrupt mask bit from said first state to said second state.

12. A method as claimed in claim 10, wherein a plurality of interrupt signals interrupt said normal sequence of program instructions, each of said plurality of interrupt signals having an associated interrupt mask bit.

13. A method as claimed in claim 12, wherein said plurality of interrupt signals include a first interrupt signal and a second interrupt signal, said first interrupt signal having a higher priority than said second interrupt signal, said first interrupt signal having an associated masking control signal and said second interrupt signal not having an associated masking control signal.

14. A method as claimed in claim 10, wherein said programmable control register is a program status register that stores a plurality of bits indicative of a current processing state.

15. A method as claimed in claim 14, wherein execution of program instructions occurs in a selectable on of a plurality of processing modes and when switching to a different processing mode said plurality of bits are saved into one of one or more saved program status registers from which said plurality of bits are restored when returning from said different processing mode subject any change of said interrupt mask bit from said second state to said first state being prevented.

16. A method as claimed in claim 10, wherein execution of said normal program instructions occurs in either a secure mode or a non-secure mode and when operating in said non-secure mode an override interrupt reserving signal selectively disables all changes to said interrupt mask bit.

17. A method as claimed in claim 10, comprising storing at least one configuration controlling parameter in a configuration coprocessor including at least one configuration register, said masking control signal being a read only configuration bit within said configuration register.

18. A method as claimed in claim 10, wherein said masking control signal is provided as a static external signal value.

* * * * *